United States Patent [19]
Matsumura et al.

[11] 4,446,832
[45] May 8, 1984

[54] METHOD AND SYSTEM FOR CONTROLLING THE IDLE SPEED OF AN INTERNAL COMBUSTION ENGINE AT VARIABLE IGNITION TIMING

[75] Inventors: Toshimi Matsumura, Ohbu; Hideya Fujisawa, Kariya; Norio Omori, Kariya; Takashi Arimura, Kariya; Hisamitsu Yamazoe, Kariya; Kiyotaka Nishiura, Kariya, all of Japan

[73] Assignee: Nippondenso Co., Ltd., Kariya, Japan

[21] Appl. No.: 321,227

[22] Filed: Nov. 13, 1981

[30] Foreign Application Priority Data

Nov. 14, 1980 [JP] Japan ................. 55-160977

[51] Int. Cl.³ .................. F02P 5/04; F02M 7/12; F02D 11/10
[52] U.S. Cl. .................. 123/339; 123/418
[58] Field of Search ......... 123/339, 340, 418, 349, 123/416, 417, 406

[56] References Cited

U.S. PATENT DOCUMENTS

| | | | |
|---|---|---|---|
| 4,291,656 | 9/1981 | Muyagi et al. | 123/339 |
| 4,297,978 | 11/1981 | Matsui | 123/339 |
| 4,338,899 | 7/1982 | Geiger et al. | 123/418 |
| 4,344,397 | 8/1982 | Geiger et al. | 123/339 |
| 4,344,399 | 8/1982 | Matsumura et al. | 123/339 |
| 4,365,599 | 12/1982 | Ikeura | 123/339 |
| 4,365,601 | 12/1982 | Yamazoe et al. | 123/339 |

*Primary Examiner*—Raymond A. Nelli
*Attorney, Agent, or Firm*—Cushman, Darby & Cushman

[57] ABSTRACT

The idle speed of an internal combustion engine is controlled in response to a variable ignition timing control signal from a microcomputer. The microcomputer derives this control signal as a function of the magnitude of engine speed variation which occurs during engine idle periods to cause the ignition timing to vary quickly in response to a transitory engine load variation. An auxiliary air delivery system may be advantageously incorporated in the idle speed control system to cooperate with the ignition timing control in response to the engine speed variation.

6 Claims, 13 Drawing Figures

METHOD AND SYSTEM FOR CONTROLLING THE IDLE SPEED OF AN INTERNAL COMBUSTION ENGINE AT VARIABLE IGNITION TIMING

BACKGROUND OF THE INVENTION

The present invention relates to a method and system for controlling the idle speed of a spark ignition internal combustion engine to suppress the variation of idle engine speed under varying operating conditions.

Known systems for controlling the idle speed of an internal combustion engine involve the use of an engine's intake air or air-fuel ratio as a controlling factor to suppress the tendency of the idle speed to vary significantly in response to a rapid change in engine load. In the known systems an auxiliary air delivery system or fuel control system is provided to control the amount of such fluidic substances to counteract the idle speed variation.

However, due to the slow response characteristics inherent in the air and fuel control systems the known idle speed control systems fail to provide effective additional output torque until the engine speed reduces considerably to a low level and are thus not satisfactory to counteract rapid changes in engine load. Furthermore, if the air-fuel ratio of the engine is controlled in a closed loop for the purpose of reducing noxious emissions, an excessive amount of the controlling parameter of the known idle speed control system would interfere with the closed-loop controlled air-fuel ratio, resulting in the latter hunting or oscillating above and below an optimum value.

SUMMARY OF THE INVENTION

It is therefore an object of the present invention to provide a method and system for idle speed control which is quickly responsive to rapidly varying engine operating condition.

The stated object is accomplished by controlling the ignition timing of the engine when idled according to the amount of variation of idle engine speed.

The method of the present invention for controlling the idle speed of an internal combustion engine comprises the steps of detecting when the engine is in idle state, detecting the magnitude of a variation of the speed of the engine when the idle state is detected, and adjusting the ignition timing of the engine as a function of the detected magnitude of engine speed variation in a direction toward reducing the magnitude of subsequently occurring engine speed variations.

Preferably, a reference engine speed value is generated as a function of one or more of engine operating parameters and the deviation of the engine speed from the reference engine speed value is derived to cause the ignition timing to vary according to the derived deviation of engine speed.

In a further preferred embodiment of the invention, a microcomputer is advantageously employed. The microcomputer is programmed to execute the following steps:

(a) generating a reference ignition angle value as a function of the amount of air introduced into the engine;

(b) detecting the magnitude of variation of the engine speed when the idle state is detected;

(c) generating an ignition correction angle value as a function of the magnitude of engine speed variation according to a predetermined transfer function;

(d) arithmetically combining the reference and correction angle values to derive a combined angle value;

(e) causing ignition to occur at an advance angle as a function of the combined angle value.

The ignition timing control of the invention is further employed to advantage in combination with an additional air delivery control system which supplies additional air to the engine as a function of an engine speed variation to produce a combined effect on reducing the tendency of the engine to varying its speed as a result of a rapid change in engine load.

BRIEF DESCRIPTION OF THE DRAWINGS

Further advantages and features of the present invention will become apparent from the following detailed description which is given by way of example with reference to the accompanying drawings, in which.

DETAILED DESCRIPTION

Figure 1:
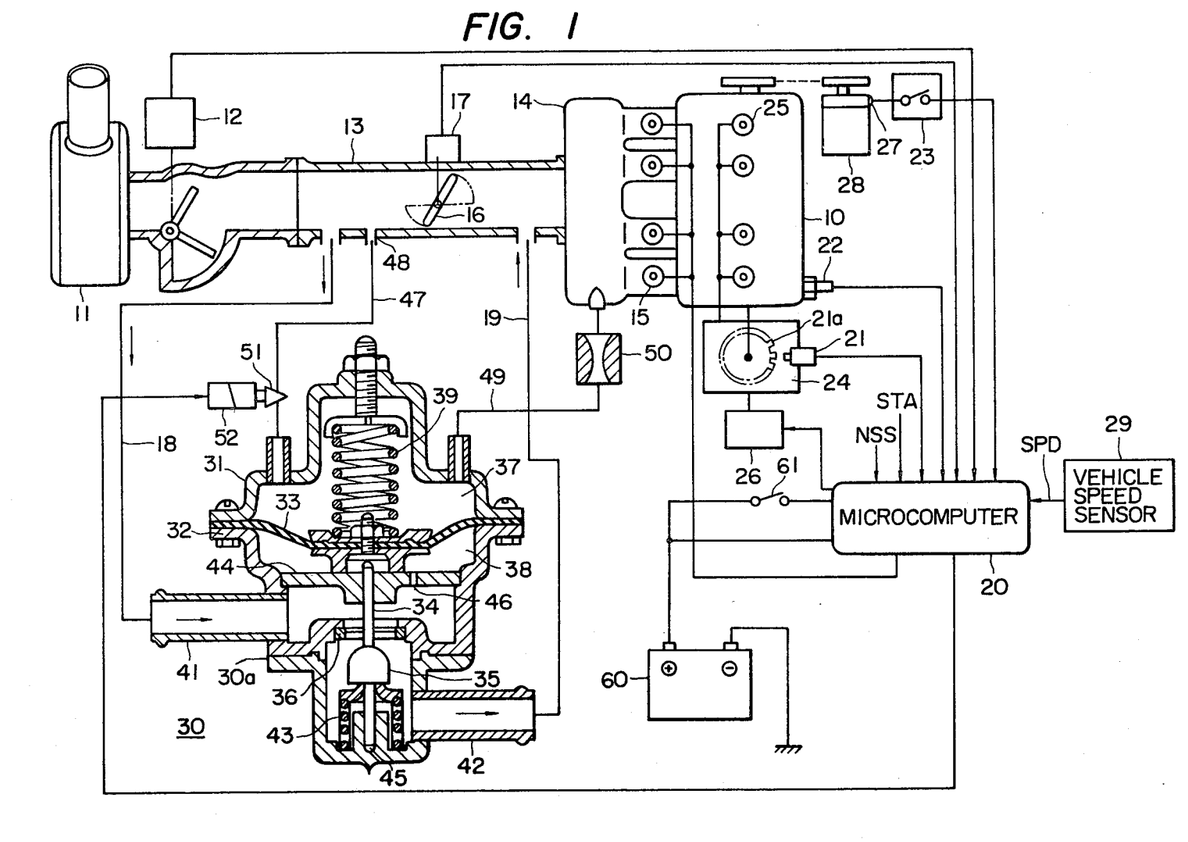
FIG. 1 is a diagram illustrating the idle speed control system of the invention incorporated in a four-cycle spark ignition, fuel-injected internal combustion engine.

Referring now to FIG. 1, there is shown an embodiment of an idle speed control system of the present invention which, for the purpose of disclosure, is incorporated in a fuel-injected internal combustion engine.

According to the principal aspect of the invention, the idle speed of the engine is controlled by optimizing the ignition timing so that variations in the idle speed is held within an acceptable range under varying operating conditions. The idle speed control system preferably includes an auxiliary air delivery system which introduces additional air to the engine through a conduit that bypasses the throttle valve of the engine's main air intake passage. As will be described later, the auxiliary air delivery system is controlled in combination with the idle speed ignition timing control to further suppress the idle speed to a narrower range. It is to be noted that the present invention could equally be as well incorporated in carburetor-controlled engines and that the auxiliary air delivery system could be replaced with a system which controls the throttle opening of the main intake air.

In FIG. 1 a four-cycle spark ignition internal combustion engine 10 is supplied with intake air through an air cleaner 11 through the main air intake passage 13 in which an airflow meter 12 and a throttle valve 16 are located upstream of intake manifold 14, the latter being provided with solenoid operated fuel injection valves 15.

The main intake air quantity of the engine 10 is controlled by the throttle valve 16 which is responsive to the operator controlled accelerator pedal, not shown, while the fuel quantity is controlled by the injection valves 15 in response to fuel control pulses supplied from a microcomputer 20.

Microcomputer 20 receives engine speed indicating parameter N in the form of pulses from an electromagnetic pickup device 21 located in the ignition distributer 24 and an intake airflow parameter AFM from the airflow meter 12 as basic input parameters for electronically controlling the quantity of fuel to be injected in a known manner. Microcomputer 20 is also supplied with a warm-up signal THW from a thermistor coolant temperature sensor 22 to additionally control the fuel quantity. For the purpose of idling speed control the microcomputer 20 is in further receipt of other signals including a throttle position signal from a throttle sensor 17 indicating that the throttle valve 16 is at or near the fully closed position and at the full open position, an on-off signal AC indicating the operating state of a vehicle-mounted air conditioner from a power switch 23, an engine starter signal STA, a torque converter position signal TQ indicating the neutral position and drive range of an automatic power transmission, and a vehicle speed signal SPD from a vehicle speed sensor 29.

The auxiliary air delivery system 30 comprises a diaphragm operated valve 30a having inlet and outlet ports 41 and 42 coupled through bypass conduits 18 and 19 to the main intake passage 13 at points respectively upstream and downstream of the throttle valve 16. The auxiliary air control valve 30a comprises a diaphragm 33 which is located between valve housings 31 and 32 to create an upper chamber 37 and a lower chamber 38 and is urged by a compression spring 39 to move a valve member 35, coupled thereto by a shaft 34, in a direction away from a valve seat 36 to increase the airflow passing through the inlet and outlet ports 41, 42. Valve member 35 is of a needle valve type which is in turn urged by a compression spring 43 toward the valve seat 36 with a relatively small returning force to counteract the compression spring 39. Diaphragm 33 is displaceable in a valve opening direction in response to an increase in absolute pressure in the upper chamber 37 and in a valve closing direction in response to a decrease in said absolute pressure. The valve 30a is constructed so that the airflow additionally supplied to the engine 10 is variable exponentially as a function of displacement of the valve member 35 from the lowermost position of FIG. 1, which is determined by a member 44, to a raised position.

The lower chamber 38 is in communication with the inlet port 41 through an opening 46 formed in the member 44 in which the shaft 34 is slidably journalled, while the upper chamber 37 is in communication with an intake port 48 of the main intake passage 13 upstream of throttle valve 16 through a conduit 47 and in communication with the intake manifold 14 through a restriction 50 disposed in a conduit 49. Located in the conduit 47 is the valve member 51 of a solenoid operated on-off valve 52 to control the absolute pressure in the upper chamber 37 in response to a pulse-width modulated control signal supplied from the microcomputer 20.

According to a practical aspect of the invention, the engine speed sensor 21 is located with respect to a toothed wheel 21a mounted to rotate with the engine crankshaft to generate a pulse for every 30-degree crankshaft angle. The ignition distributer 24 is arranged to distribute the high tension voltage to spark plugs 25 generated by an ignition device 26 when the latter receives an ignition control signal from the microcomputer 20 representing the timing and conduction period of a current that flows in the primary winding of the ignition coil included therein. The air conditioner power switch 23 is arranged to operate a solenoid operated clutch 27 to couple a compressor 28 to the output shaft of engine 10 when the air conditioner is turned on. The vehicle speed sensor 29 detects the circumferential speed of a vehicle wheel and generates pulses at a frequency proportional to that speed.

Figure 2:
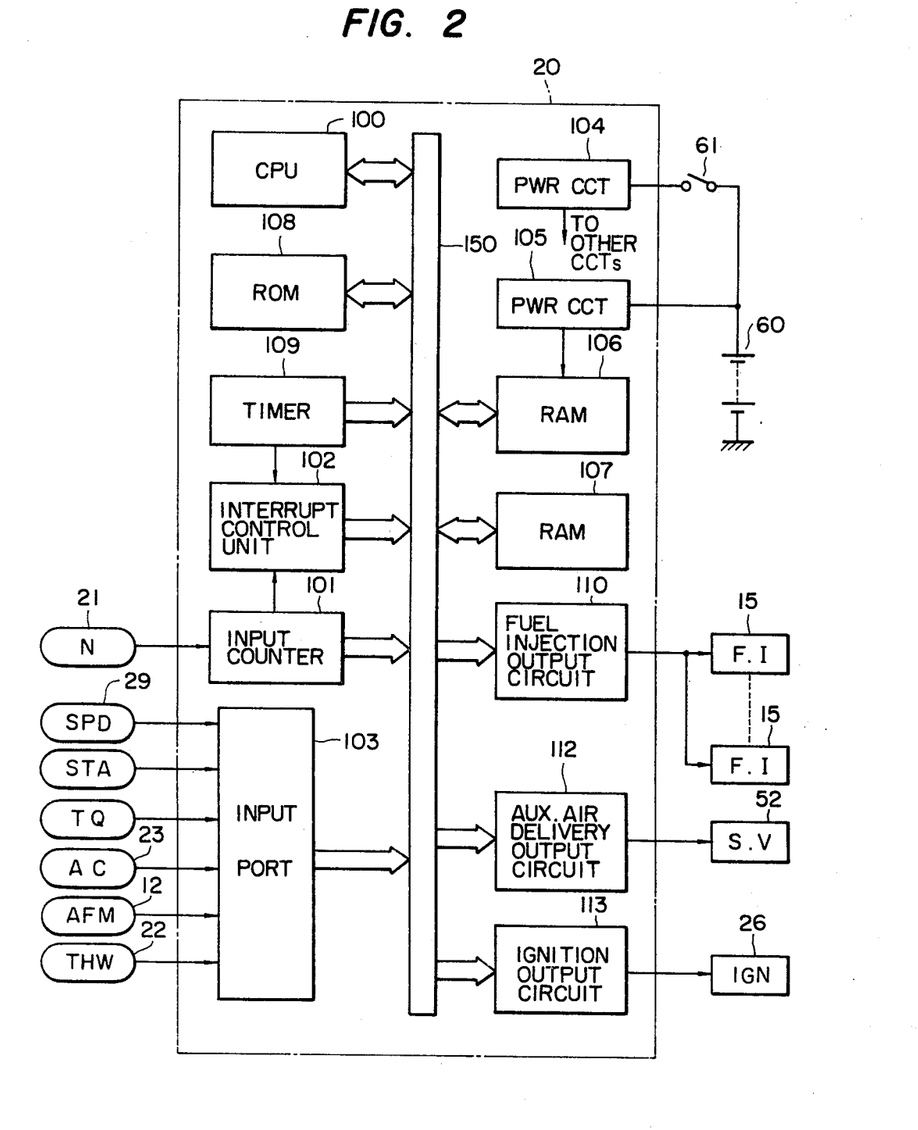
FIG. 2 is a diagram of the hardware of the microcomputer of FIG. 1.

The hardware of the microcomputer 20 is schematically shown in FIG. 2. The microcomputer 20 is of a conventional type which includes a central processor unit 100 which interacts with various units through a common bus system 150. An input counter 101 receives engine speed pulses from the engine speed sensor 21 and provides the CPU 100 with an engine speed digital word N by counting clock pulses during the interval between the successively received input pulses and further supplies an interrupt control unit 102 with an interrupt command signal in synchronism with each engine crankshaft revolution to cause it to supply an interrupt signal to the CPU over the common bus system 50.

An input port 103 includes analog to digital converters and a multiplexer to convert the various analog input signals THW, AFM, AC, TQ, STA and SPD into corresponding digital words and applied through the multiplexer and common bus 150 to the CPU.

A random access memory 106 is powered constantly by a battery 60 after voltage stabilization by a stablizing power circuit 105 to act as a battery-backup nonvolatile memory; the other circuits of the microcomputer being powered by another voltage stabilizing circuit 104 from the same battery through an engine ignition key switch 61. Another random access memory 107 which acts as a volatile memory and the nonvolatile RAM 106 serve as storage locations for temporarily storing the intermediate results of various computing operations. A read only memory 108 stores the program for executing various functions according to the invention.

A timer 109 includes a clock source and a counter arranged to initiate counting the clock pulse to measure the elapse of time necessary for various computing functions and supplies the CPU 100 and interrupt control unit 102 with the clock pulse and a timed interrupt signal, respectively.

Digital outputs from the CPU 100 are delivered to output circuits 110, 112 and 113 which are associated respectively with fuel injectors 15, auxiliary air control valve 52 and ignition device 26. Each output circuit includes a latch for storing the output from the CPU and a programmable counter for counting clock pulses from the timer 109 for a period determined by the latched CPU output and a power transistor through which the output of the counter is delivered to the associated device. More specifically, the data latched in the output circuit 110 represents the fuel quantity which is converted to a corresponding width of a fuel injection pulse. The data latched in the output circuit 112 represents an optimum duty ratio D of pulses for best idling speed control to be applied to the solenoid operated valve 52, while the data latched in the circuit 113 is the advance angle data $\theta$ which causes ignition to occur at optimum timing for best idling control.

Figure 3:
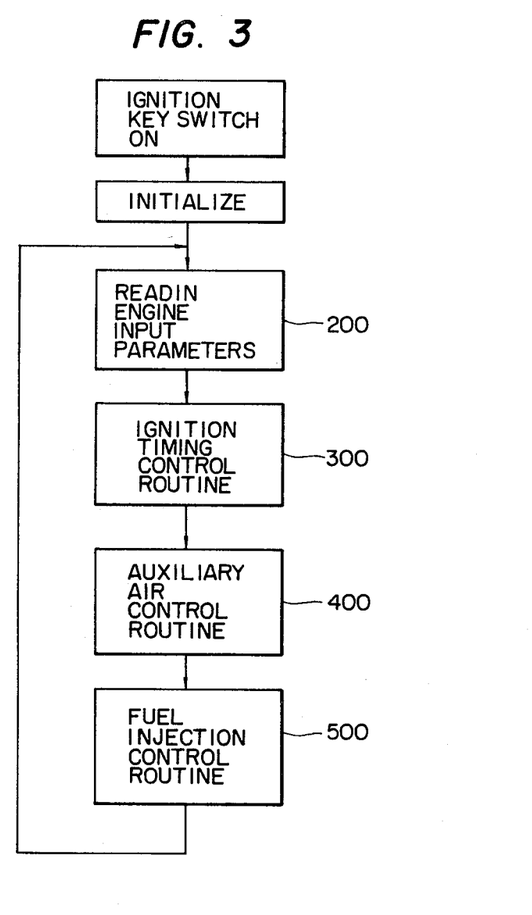
FIG. 3 is a flow diagram of the main routines associated with the microcomputer of FIG. 1.

FIG. 3 is an illustration of the main routines stored in the ROM 108 according to which the microcomputer 100 is instructed to perform various computing operations. The main routines include an initializing routine which starts in response to the operation of the ignition key switch 61 to initialize various controlling data. Subsequently executed is a data entry routine 200 in which the engine operating parameters described previously and other necessary data (atmospheric pressure, ambient temperature, etc.) are written into an associated random access memory for operating the engine 10 for best fuel economy, minimum exhaust emissions and minimum idle speed variation. An ignition control routine 300 follows to determine the optimum advance angle for best idling speed control in a manner to be described. The program preferably includes an auxiliary air control routine 400 to determine the optimum amount of auxiliary air for best idling speed control. A fuel injection control routine 500 is executed in succession to determine the optimum fuel quantity appropriate for engine operations under varying conditions. The routines 200 to 500 are executed in a repeated sequence.

Figure 4:
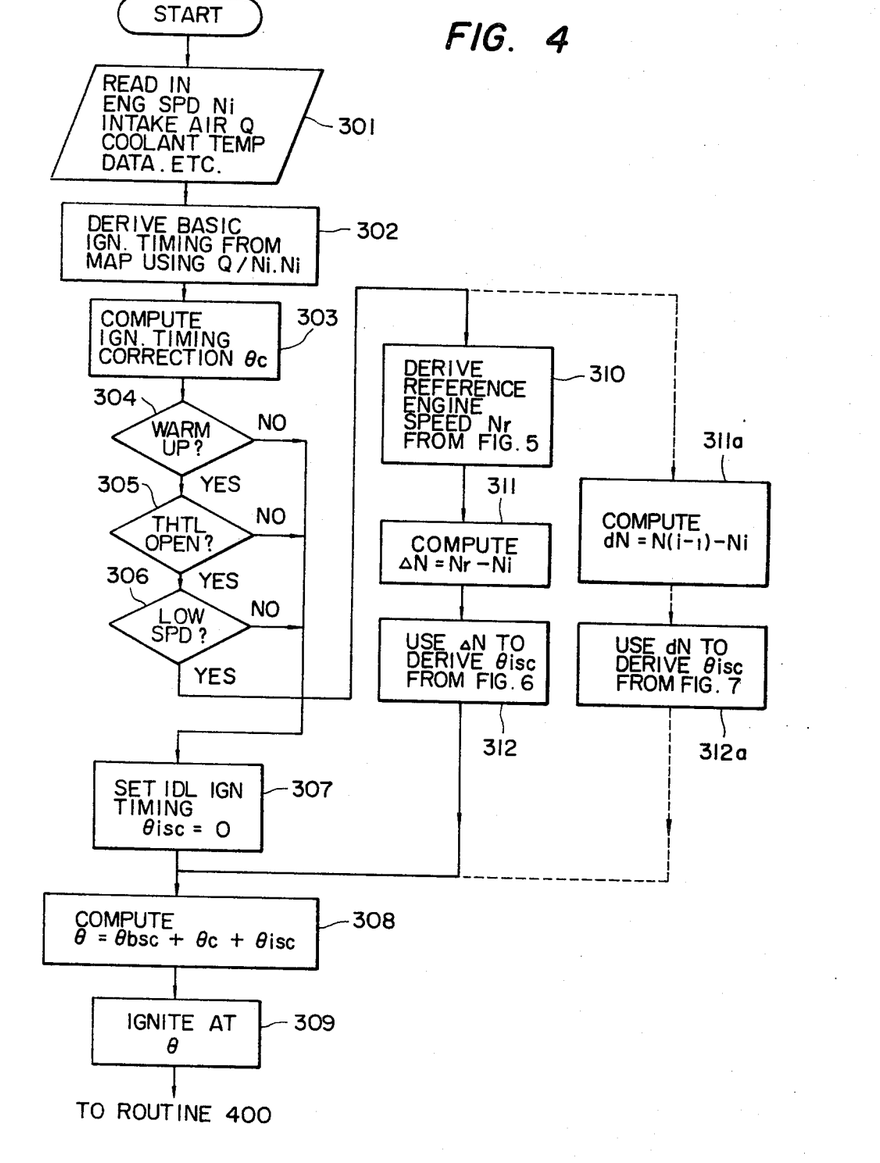
FIG. 4 is an illustration of the detail of the ignition timing control routine of FIG. 3.

According to a first preferred embodiment of the invention, the idle speed of the engine is controlled by the ignition control routine 300 of which the detail is shown in FIG. 4. The ignition control routine 300 is initiated at step 301 by reading various data including engine speed N, intake air quantity Q, coolant temperature THW, engine start parameter STA, air conditioner status data AC and throttle position data out of the RAM in which these data have been written in the data entry routine 200. At step 302, the CPU 100 determines a basic ignition angle $\theta$bsc advanced with respect to the top dead center by computing a predetermined formula as a function of (Q/Ni, Ni) by reading a basic ignition map out of the nonvolatile RAM 106 in a known table lookup method, where Ni is an average of four engine speed values derived at each 30-degree crankshaft angle for an interval of 120 degrees.

At step 303, a correction advance angle $\theta$c is derived by reading a correction advance angle map from the RAM 106 as a function of the various engine operating parameters for the purpose of summing the derived correction angle with the basic advance angle in a later step.

In the succeeding steps 304, 305 and 306 the CPU 100 determines whether the engine 10 is idled by checking the coolant temperature of the above-predetermined value at step 304, fully or nearly closed throttle at step 305 and a vehicle speed of a below-2 km value at step 306. If at least one of these conditions is not satisfied, a step 307 is executed by setting an idle state correction angle $\theta$isc equal to zero. Subsequently, the basic ignition angle $\theta$bsc is summed with the correction angles $\theta$c and $\theta$isc to derive an ignition timing output $\theta$ at step 308. At step 309 the ignition timing output $\theta$ is transmitted to the ignition output circuit 113 to cause ignition to occur at $\theta$.

Figure 5:
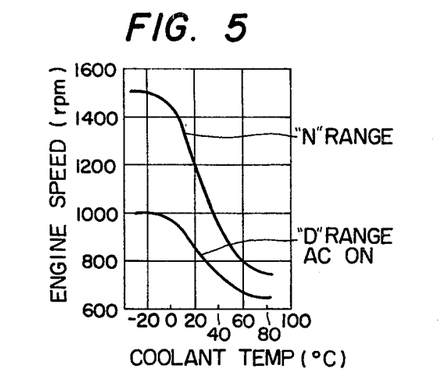
FIG. 5 is a graphic illustration of a transfer function stored in a memory of the microcomputer in the form of a map describing the relationship between engine coolant temperature and reference engine speed with torque converter and air conditioner as parameters.
Figure 6:
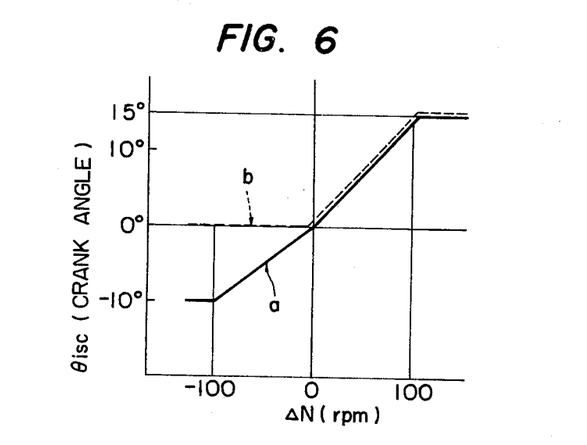
FIGS. 6 and 7 are graphic illustrations of transfer functions each describing the relationship between engine speed variation and idle speed control corrective ignition advance angle.

If the engine is in idle state, "yes" decision will be made in each of the steps 304, 305 and 306 and a step 310 is executed to derive a reference engine speed value Nr as a function of coolant temperature data THW, torque converter status data TQ (neutral or drive range) and air conditioner status data AC from a table lookup map which describes the relationship as illustrated in FIG. 5. A step 311 is subsequently executed to derive a difference $\Delta N$ between the reference engine speed setting Nr and the average engine speed value Ni. The speed difference data $\Delta N$ is used in a step 312 to derive the idle state ignition timing correction data $\theta$isc from maps describing optimum relationships for engine idling between correction advance angle versus engine speed deviation $\Delta N$ as illustrated in FIG. 6. The relationship as indicated at "a" by solid line in FIG. 6 is stored in a map which is used when the engine speed deviation assumes a positive or negative value. Another relationship indicated at "b" by broken lines is stored in a separate map which may be used for advance angle correction only when the speed deviation takes a positive value. The step 312 is followed successively by the steps 308 and 309 to cause ignition to occur at the advance angle optimized at step 308.

Figure 7:
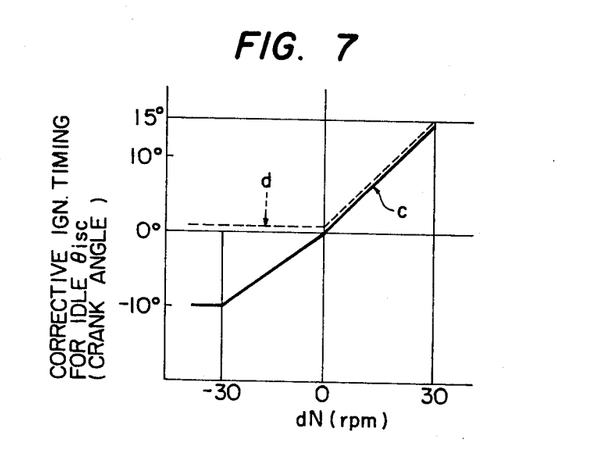

The idle state correction angle data $\theta$isc could also be derived from different maps as indicated at "a" and "b" in FIG. 7 in which $\theta$isc is derived as a function of speed deviation dN in a range between $-30$ rpm to $+30$ rpm which is narrower than the $-100$ rpm to $+100$ rpm range of FIG. 6, where dN represents an engine speed deviation between the immediately preceding engine speed value N(i−1) and the latest engine speed value Ni. The mapped relationship, FIG. 7, can be effectively used for making the idle speed control system quickly respond to a rapid variation of engine speed to suppress its amplitude. In that instance, the steps 310, 311 and 312 are replaced with steps 311a and 312a.

By optimizing the ignition timing during engine idle state, the present invention has the benefit of suppressing engine speed variation below an acceptable value under varying engine conditions.

Figure 8:
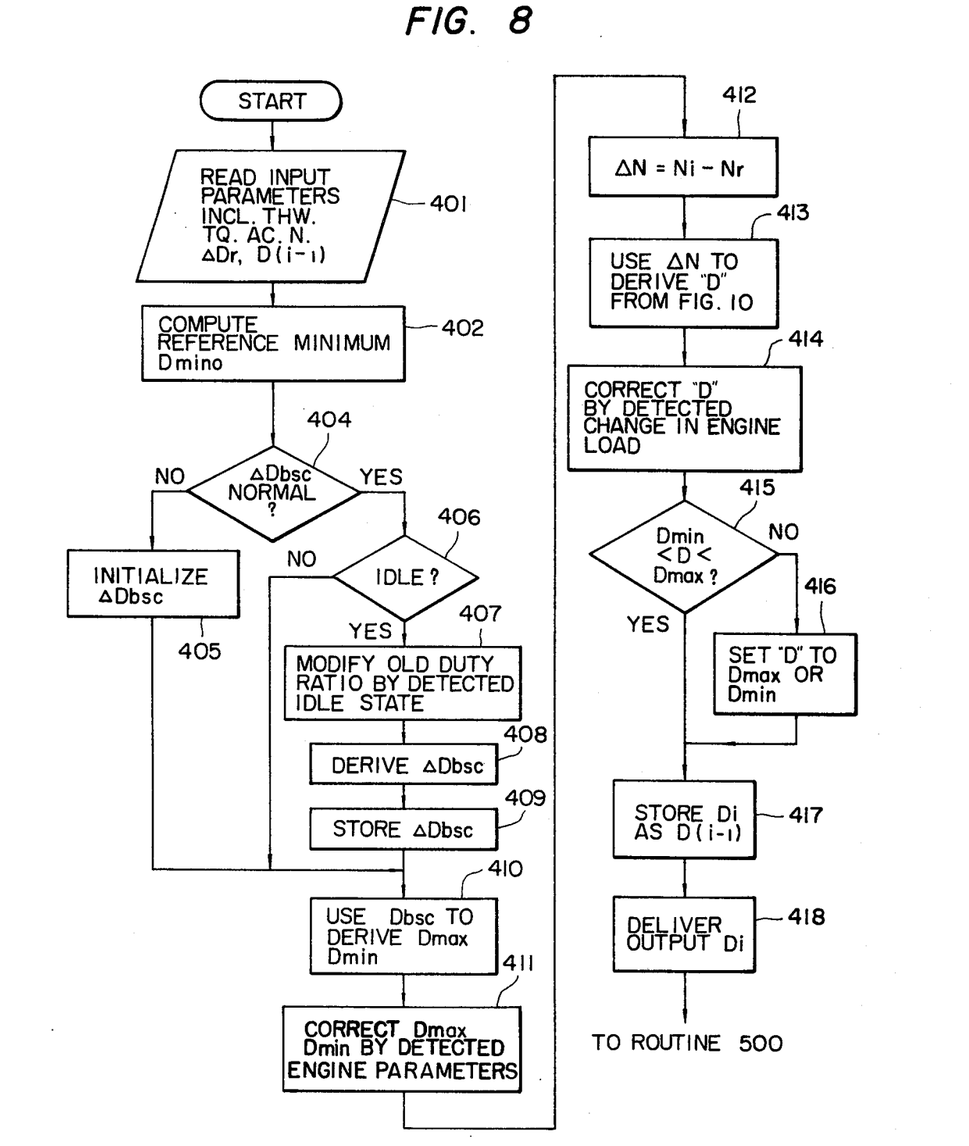
FIG. 8 is an illustration of the detail of an auxiliary air delivery control routine of FIG. 3.
Figure 9:
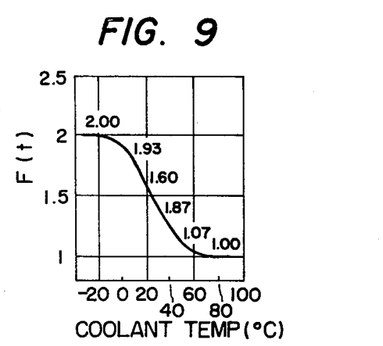
FIG. 9 is a graphic illustration of a transfer function stored in the computer memory in the form of a map describing the relationship between engine coolant temperature and a control variable used to initialize the auxiliary air control duty ratio when the engine is started.

In a preferred embodiment of the invention, the auxiliary air delivery control routine 400 is executed in addition to the ignition timing control during engine idle periods according to the flow diagram shown in FIG. 8. At step 401, the CPU 100 reads off input data including coolant temperature THW, air conditioner status AC, torque converter operating state TQ, and engine start STA and engine speed N from the input port 103 and reads off air control duty ratio D(i−1) which has been derived and stored in the nonvolatile memory in the previous computer operating cycle as well as air control basic correction duty ratio $\Delta$Dbsc. If the engine start signal STA is present, the air control duty ratio data D(i−1) which has been used in the last engine operation is dismissed as being inappropriate and the CPU I)100 translates the coolant temperature data according to a transfer function F(t) shown in FIG. 9 to derive initial duty ratio data. At step 402, the CPU determines a reference or lowermost value of minimum duty ratio Dmino using the transfer function F(t).

At step 404, the CPU 100 checks to see whether the basic correction duty ratio ΔDbsc is within a predetermined normal range. If, for example, the battery 60 is removed for recharging or replacement, the stored contents of the nonvolatile RAM 106 will be completely lost and in that instance "no" decision is made at step 404 to initialize ΔDbsc at step 405 by reading an initial value ΔDbsc out of the volatile memory 108. If the basic correction data ΔDbsc is found to lie within the normal range, a step 406 follows to check to see if the engine is in a steady idle state by detecting the changes in various engine operating conditions including the operating states of air conditioner, torque converter, coolant temperature and engine speed and comparing them with a set of predetermined steady idle state conditions. If any one of the steady idle conditions is met, the CPU advances to a step 407 to modify the previous duty ratio D(i−1) to D(i'−1) only if the detected steady idle condition corresponds to a state in which the torque converter is at neutral position and the air condition is not operating.

At step 408, the previous duty ratio D(i−1) is used as a reference duty ratio Drd to compute basic correction duty ratio ΔDbsc=Drd−Dmino−ΔHl (where ΔHl represents a constant) so that the difference between Drd and Dmino equals the constant ΔHl and the basic correction data ΔDbsc is corrected to a new value. The corrected data ΔDbsc is then stored in the RAM 106 at step 409.

A step 410 is executed following the step 405, 409 or following the step 406 when "no" decision is made therein to read ΔDbsc from the RAM 106 and derives a maximum duty ratio Dmax and a minimum duty ratio Dmin which are optimized for a basic operating condition in which the torque converter is at neutral and air conditioner is turned off. This is accomplished by computing Dmin=Dmino+ΔDbsc and Dmax=Dmin+ΔH2, where H2 is a constant.

Figure 11:
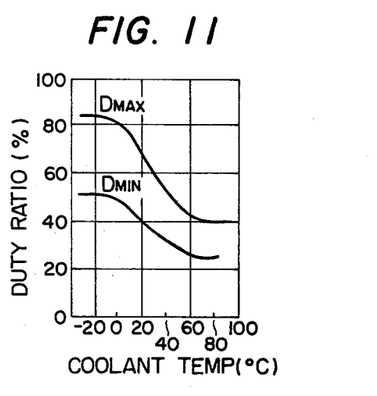
FIG. 11 is a graphic illustration of a transfer function stored in the computer memory in the form of a map describing the relationship between engine coolant temperature and auxiliary air control reference duty ratio use to determine whether the ratio lies in an acceptable range.

The maximum and minimum duty ratio values are corrected in a step 411 to optimum values depending on the torque converter position and air conditioner operating state and further corrected as a function of coolant temperature as illustrated in FIG. 11.

At step 412, an engine speed difference ΔN between the reference setting speed Nr derived in the step 310, FIG. 4, and the latest engine speed N derived in the step 212, is detected.

Figure 10:
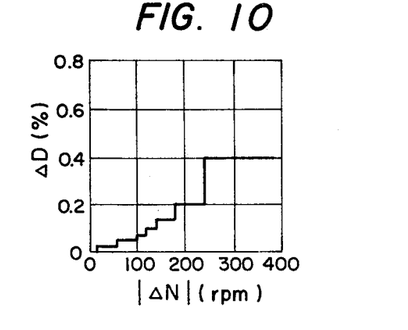
FIG. 10 is a graphic illustration of a transfer function stored in the computer memory in the form of a map describing the relationship between engine speed variation and auxiliary air corrective control duty ratio.

The absolute value of the difference value ΔN is used in a step 413 to derive a corresponding correction duty ratio ΔD from a table lookup map according to a transfer function as described in FIG. 10. The correction value ΔD is arithmetically combined with the previous duty ratio D(i−1) read out of memory at step 401 by computing D=D(i−1)−ΔD when ΔN is greater than zero or D=D(i−1)+ΔD when ΔN is equal to or smaller than zero.

The duty ratio D corrected in the step 413 is further corrected at step 414 in response to any change in the operating conditions of torque converter and air conditioner to suppress the overshooting or undershooting of the engine speed which might otherwise result from such engine load changes.

At step 415, the CPU 100 checks to see if the duty ratio D derived in step 414 falls within the range between Dmin and Dmax depicted in FIG. 11. If either the minimum or maximum value is exceeded, the duty ratio D is set equal to Dmin or Dmax, respectively, at step 416. The steps 415 and 416 are followed by a step 417 to store the duty ratio D in the RAM 106 as D(i−1) and subsequently followed by a step 418 to deliver the duty ratio data D to the air control output circuit 112 which controls the air control valve 52.

Figure 12:
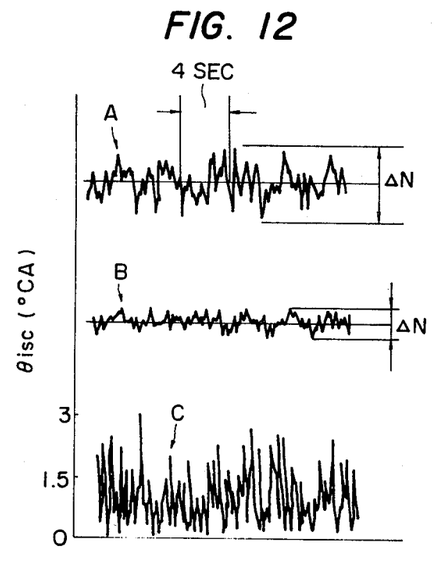
FIGS. 12 and 13 are illustrations of the results of experiments to ascertain the advantage of the invention in favor of conventional idle speed control systems in which the only controlling factor is the additionally supplied auxiliary air.
Figure 13:
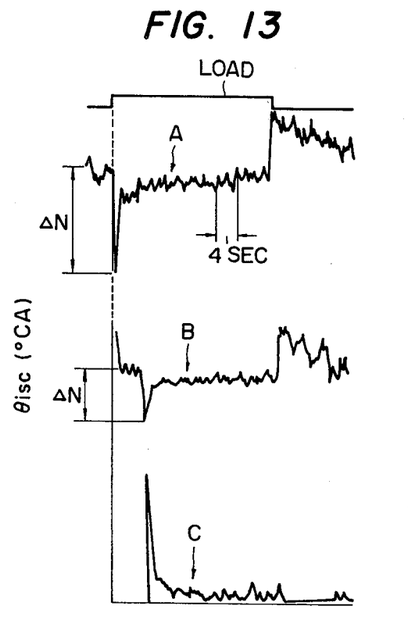

FIG. 12 is an illustration of the steady state idle speed characteristic of the invention (in which the ignition timing and auxiliary air are controlled using the characteristic "b" of FIG. 6) for making a comparison with the corresponding characteristic of a prior art idle speed control system in which the auxiliary air is the only controlling factor. As indicated by a waveform B the magnitude of idle speed deviation ΔN according to the invention varies with the idle state correction advance angle θisc indicated by a waveform C and compares favorably with a waveform A of the prior art. FIG. 13 is an illustration of the transient response characteristic of the invention using the combined ignition timing and auxiliary air control with the characteristic "b" for comparison with the corresponding transient characteristic of the prior art in response to an increase in engine load due to the operation of power steering system. As clearly shown in FIG. 13, the amount of speed deviation according to the invention, indicated by waveform B, is reduced to approximately half the value of the prior art system, indicated by waveform A, by virtue of the correction angle θisc which quickly counteracts the transient.

What is claimed is:

1. An idle speed control system for a spark ignition internal combustion engine having a main air delivery means for introducing air to the engine in response to a manual command, an auxiliary air delivery means for introducing additional air to said engine according to an adjustable setting and means for causing ignition to occur in said engine at variable timing according to an adjustable setting, the system comprising:
   engine parameter monitor means for monitoring a plurality of engine operating parameters including a parameter indicative of the speed of the engine, and
   data processing means responsive to a plurality of the monitored engine operating parameters for detecting when said engine is in an idle state, deriving a reference engine speed setting from the monitored engine operating parameters when said idle state is detected, detecting the deviation of the monitored engine speed from said reference speed setting, and simultaneously adjusting the settings of said variable ignition timing and said auxiliary air delivery means according to said deviation.

2. An idle speed control system as in claim 1, wherein:
   said plurality of monitored engine operating parameters include a parameter indicating the temperature of said engine, and
   said data processing means includes memory means for storing reference engine speed data in locations addressable as a function of the monitored engine temperature according to a predetermined transfer function describing a relationship between the reference engine speed setting and the engine temperature, said data processing means operating to address the stored reference engine speed data in response to said monitored engine temperature and compare the addressed data with the monitored engine speed to detect the engine speed deviation.

3. An idle speed control system as in claim 2, wherein:

said memory means further stores auxiliary airflow control data in locations addressable as a function of said deviation according to a predetermined transfer function describing a relationship between the rate of the additional air and said deviation, and said data processing means is programmed to address the stored airflow control data in response to said deviation to adjust the setting of said auxiliary air delivery means.

4. An idle speed control system as in claim 2, wherein:

said memory means further stores ignition time setting data in locations addressable as a function of said deviation according to a predetermined transfer function describing a relationship between the ingition time setting and said deviation, and said data processing means is programmed to address the stored ignition time setting data in response to said deviation to adjust the setting of said ingition timing.

5. A method for controlling a spark ignition internal combustion engine having main air delivery means for introducing air thereto according to a manual command and auxiliary air delivery means for introducing thereto additional air according to an adjustable setting, and an ignition device for generating ignition at variable timing according to an adjustable setting, comprising the steps of:

(a) constantly monitoring the operating speed of said engine;
(b) detecting when said engine is in an idle state;
(c) deriving a reference engine speed setting in response to the detection of said idle state;
(d) detecting the amount of deviation of the monitored engine speed from said reference speed setting; and
(e) simultaneously adjusting the settings of said variable ignition timing and said auxiliary air delivery means according to the detected amount of deviation.

6. A method as in claim 5, wherein the step (c) comprises monitoring the temperature of said engine and the amount of engine load and deriving said reference engine speed as a function of the monitored temperature and engine load.

* * * * *